(12) United States Patent
Nelson et al.

(10) Patent No.: US 10,288,278 B2
(45) Date of Patent: May 14, 2019

(54) OPEN SIGHT GLASS SYSTEM

(71) Applicants: Neville Adolphus Nelson, Monroe, NJ (US); Sherwin Arlon Nelson, Barnegat, NJ (US)

(72) Inventors: Neville Adolphus Nelson, Monroe, NJ (US); Sherwin Arlon Nelson, Barnegat, NJ (US)

(73) Assignee: Sherwin Arlon Nelson, Barnegat, NJ (US)

( * ) Notice: Subject to any disclaimer, the term of this patent is extended or adjusted under 35 U.S.C. 154(b) by 0 days.

(21) Appl. No.: 15/635,487

(22) Filed: Jun. 28, 2017

(65) Prior Publication Data

US 2019/0003702 A1  Jan. 3, 2019

(51) Int. Cl.
 *F22B 37/52* (2006.01)
 *F22B 37/78* (2006.01)
 *F22B 37/38* (2006.01)
 *G01F 23/02* (2006.01)

(52) U.S. Cl.
 CPC ............. *F22B 37/52* (2013.01); *F22B 37/38* (2013.01); *F22B 37/78* (2013.01); *G01F 23/02* (2013.01)

(58) Field of Classification Search
 CPC .......... F22B 37/38; F22B 37/52; F22B 37/56; F22B 37/78; G01F 23/02; G01F 3/38; G01B 7/003; G01B 7/14; G01D 5/202
 USPC ........... 73/323, 326, 324, 325, 328; 116/276
 See application file for complete search history.

(56) References Cited

U.S. PATENT DOCUMENTS

| | | | | |
|---|---|---|---|---|
| 18,420 A * | 10/1857 | Whiteley | ............... | G01F 23/02 73/326 |
| 640,442 A * | 1/1900 | Clarke | .................. | G01F 23/02 73/324 |
| 1,026,309 A * | 5/1912 | Hackett | .................. | F22B 37/78 73/328 |
| 1,460,873 A * | 7/1923 | Werbeck | ................ | F22B 37/78 73/328 |
| 2,333,397 A * | 11/1943 | Thiemer | ................ | G01F 23/02 251/148 |

(Continued)

*Primary Examiner* — William V Gilbert

(57) ABSTRACT

A sight glass system that simplifies the way a sight glass is cleaned and accessed during servicing a boiler or tank. This system allows someone to treat the boiler or tank with a cleaning liquid solution without taking off the pressure release valve of the vessel to pour in the solution. The cleaning process is now achieved easily with the sight glass system by taking off the service valve head cap to pour the treatment through the sight glass and into the boiler or tank with the shut off valves open. The system consist of a sight glass that is connected to a top and bottom valve having a removable threaded cap, a female threaded aperture on one side, and a threaded protrusion that secures the sight glass via a fastening system of a rubber washer, O-ring, and wing nut respectively. Furthermore, the top valve is designed in such a way that will allow the sight glass when not secured to slide up and out when the fastening system is unfastened. By unfastening the fastening system, the wing nut can move freely down the sight glass allowing for easy removal of the sight glass through the top valve when the cap is removed along with the rubber washer and O-ring. The top and bottom valves are connected to the main water shutoff valves respectively via a threaded member that is screwed on to the side of the valves containing a female threaded aperture.

1 Claim, 5 Drawing Sheets

(56) References Cited

U.S. PATENT DOCUMENTS 4,098,119 A * 7/1978 Coats .................. G01F 23/02
                                                                                73/323
6,857,315 B1 * 2/2005 Mills .................. G01F 23/02
                                                                               116/227

* cited by examiner

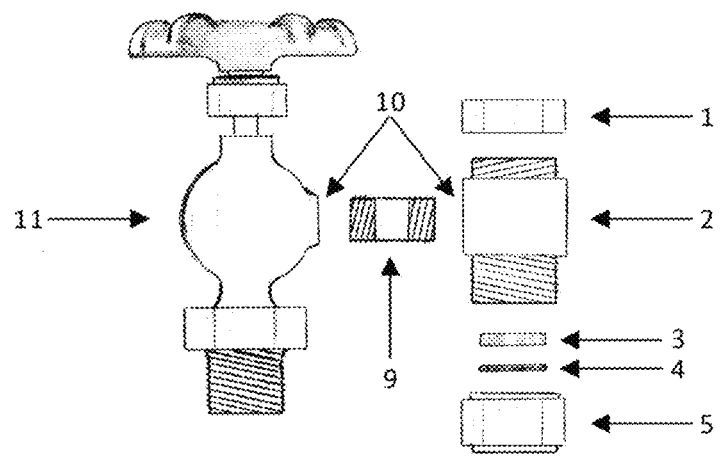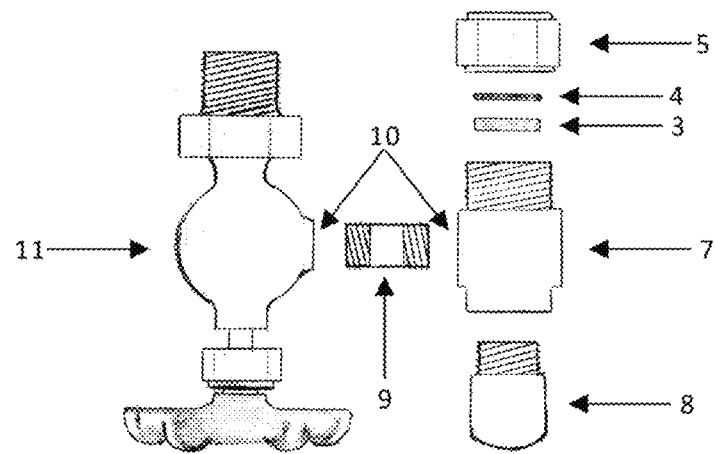
FIG. 1

OPEN SIGHT GLASS SYSTEM

BACKGROUND OF THE INVENTION

Field of the Invention

The present invention relates to a sight glass system that provides an easy to use feature for cleaning the sight glass without removing the sight glass. The sight glass of the boiler or tank will be serviced via removing the service head cap of the sight glass system and adding cleaning solutions.

Description of the Related Art

With use of the boiler to produce steam, the inside of a sight glass becomes brown due to corrosion of the cast iron parts inside the boiler. As a result, homeowners and service personnel are unable to see the level of water inside the boiler. To clean the glass, the wing nut has to be removed resulting in the sight glass being broken almost every time. Today maintenance personnel that need to perform chemical treatments to the boiler to prevent corrosion of the cast iron parts of the boiler have to remove the pressure relief valve to pour in the required treatment to the water inside of the boiler. This operation is time consuming, expensive and requires skilled personnel. It is therefore desirable to provide some system that allows for easy cleaning and replacement of a boiler sight glass.

SUMMARY OF THE INVENTION

With the present invention, neither the wing nut nor the sight glass has to be opened; only the drain plug has to be removed to begin the cleaning process. The cleaning operation can be performed by removing the service head cap and inserting a cleaning brush inside the sight glass. During the cleaning operation, the bottom main water shutoff valve must be closed to prevent back flow of water from the boiler into the sight glass. This system will allow the homeowner or maintenance personnel to unscrew the service head cap, open the main water shutoff valve to allow the liquid to travel into the boiler through the sight glass via the service head cap while the drain plug is closed.

BRIEF DESCRIPTION OF THE DRAWINGS

FIG. 1 is an exploded front view of the sight glass system of the present invention with main water shutoff valves (11) oriented at a 90° angle from the normal position;

DETAILED DESCRIPTION

Figure 2:
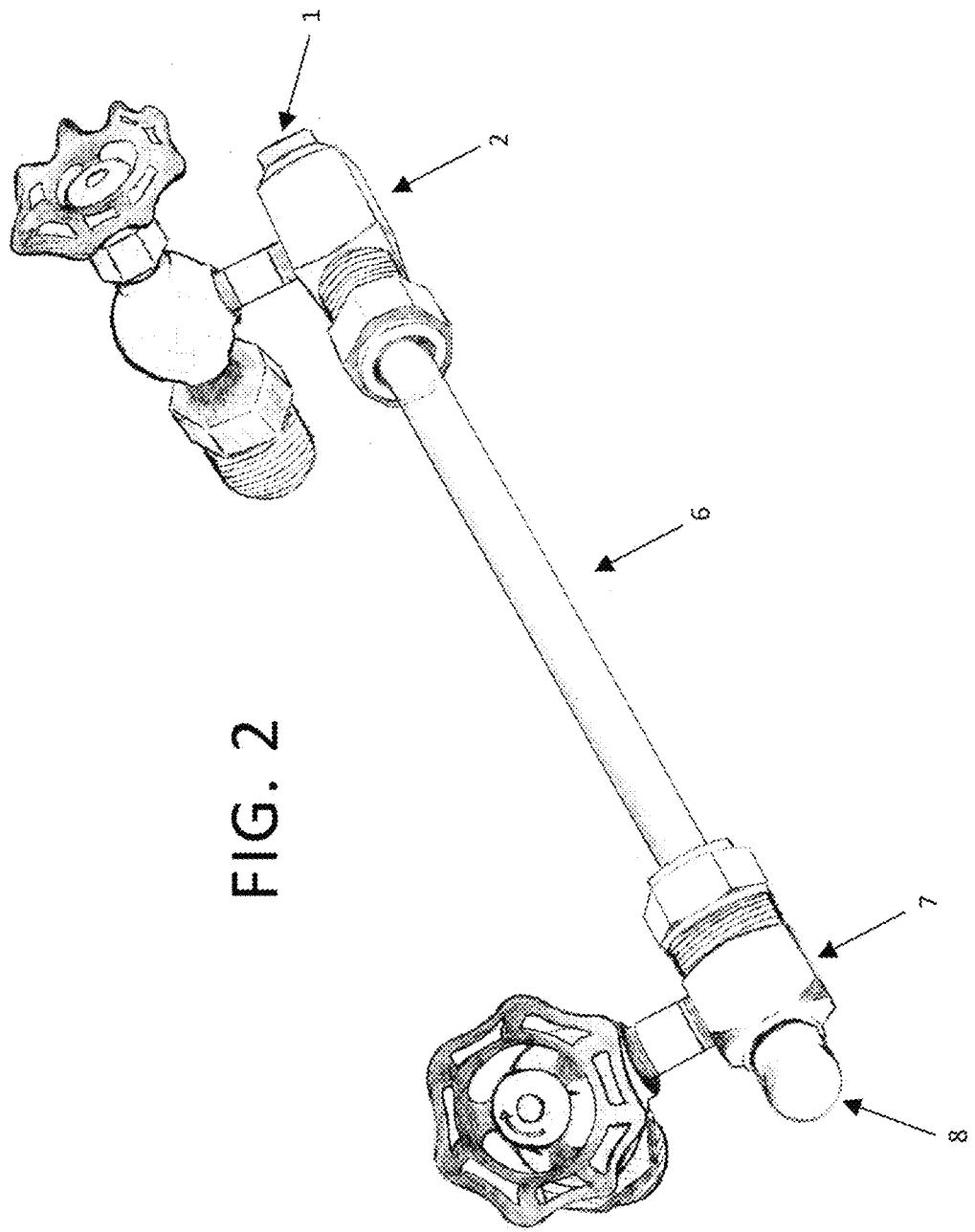
FIG. 2 is a perspective view of the sight glass system of the present invention.

FIG. 1 of the sight glass system of the present invention consists of the following components:
1 Service head cap
2 Cleaning/service valve head
3 Rubber washer
4 O-ring metal washer
5 Wing nut
6 Sight glass
7 Cleaning/service valve foot
8 Drain plug
9 Connecting tube for cleaning/service valves to be connected to main water shutoff valves
10 Female aperture for connecting tube to main water shutoff valves and cleaning/service valves
11 Main water shutoff valves Integration of Components:
1. Cleaning/service valve head (2)
   a. Top hole thread for screwing service head cap
   b. Body of cleaning/service valve head (2)
      i. Female thread aperture for connecting tube (9)
      ii. Sight glass (6) can fit inside the tubular part of the cleaning/service valve head (2) for easy replacement of the sight glass by removing service head cap (1), wing nut (5), O-ring metal washer (4), and rubber washer (3). This feature allows for the sight glass (6) to slide up and out through the opening of cleaning/service valve head (2).
   c. Bottom male thread for connecting compressing the wing nut (5) to cleaning/service valve head (2). The compression wing nut (5) compresses a rubber washer designed to seal the sight glass (6) and lock it in place. In a preferable embodiment of the present invention, a O-ring metal washer (4) is added at the inside of the wing nut (5) to bind the rubber washer (3) to prevent the rubber washer (3) from turning as you tighten the wing nut (5) to the thread of the cleaning/service valve head.
2. Connecting tube (9) fits into aperture of body of cleaning/service head (2) and also connects to top main water shutoff valve (11). Connecting tube (9) is connected to the body of the cleaning/service head (2) without touching the sight glass (6). Advantageously, the connecting tube (9) eliminate the need for a supporting structure in existing systems which prevents movements of valves that may result in sight glass (6) being cracked or broken.
3. Cleaning/service valve foot (7)
   a. Body of draining apparatus
      i. A first aperture for sight glass (6) to fit in and for bottom of sight glass (6) to sit on the end of the aperture as to prevent the sight glass (6) from moving further down
      ii. A threaded bottom aperture for any existing commercial drain plug (8)

FIG. 2 of the sight glass system shows a perspective view of the present invention indicating the unique top and bottom components which are 1, 2, 6, 7, and 8. Components 1 & 2 are located at the top and 7 & 8 are located at the bottom of the sight glass system of the present invention.

Figure 3:
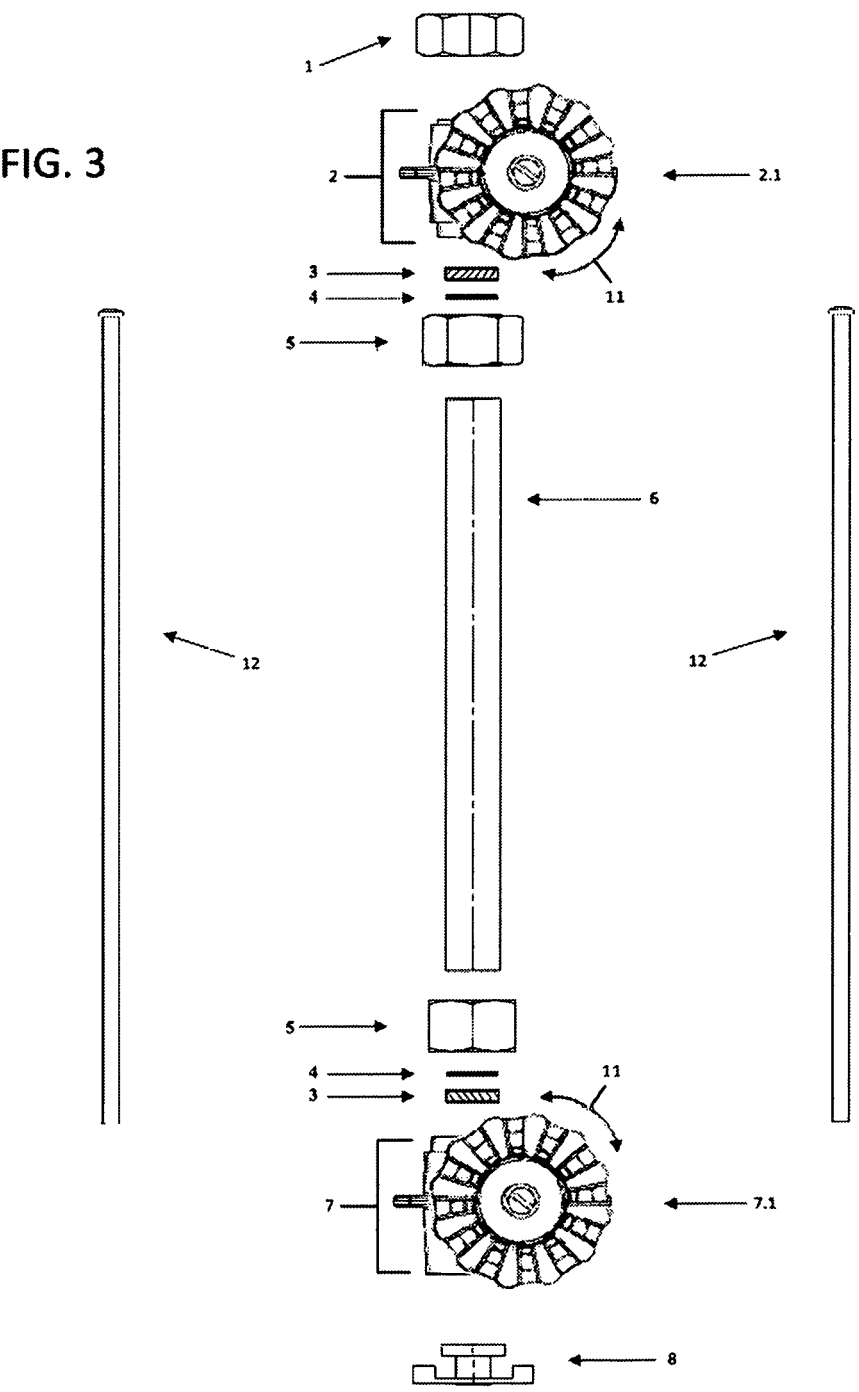
FIG. 3 is a front view of a second embodiment of the sight glass system of the present invention containing all in one components (2.1) and (7.1)

FIG. 3 of the sight glass system shows an exploded view of a second embodiment of the present invention wherein components (2.1) and (7.1) are combined components comprising of components (2, 11) and (7, 11) of FIG. 1 respectively. Component (11) of comprised components (2.1) and (7.1) is offset to the tubular part of the cleaning/service valve head (2) and cleaning/service valve foot (7) as to allow sight glass (6) to freely slide in and out of cleaning/service valve head (2) and cleaning/service valve foot (7) absent obstruction.

Additionally, this embodiment of the present invention demonstrates the use of protection rods (12) with respect to components (2.1) and (7.1).

Figure 4:
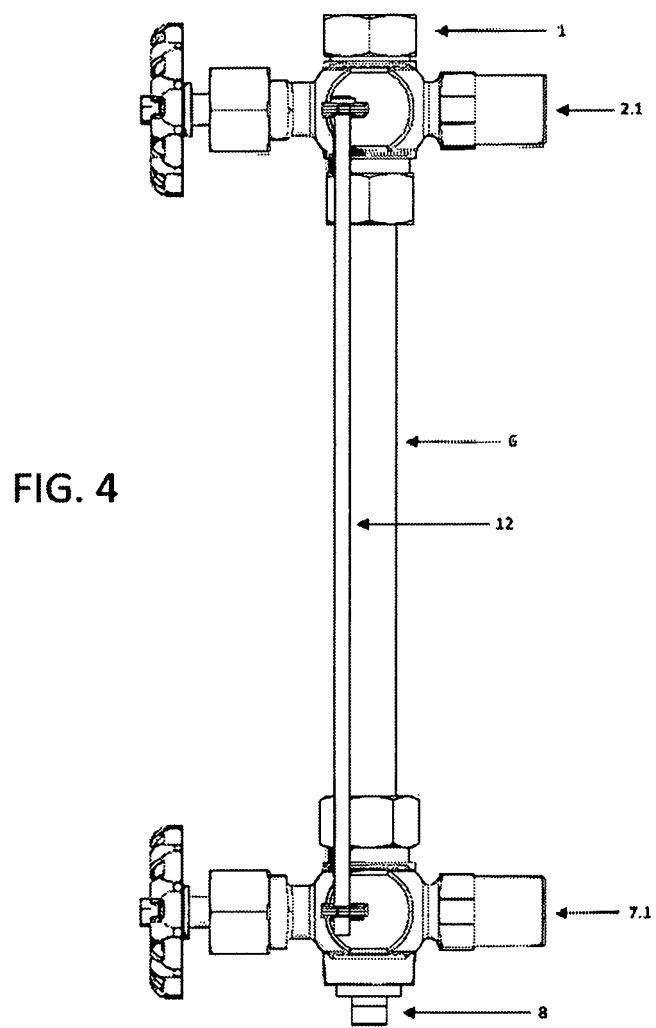
FIG. 4 is a side view of a second embodiment of the sight glass system of the present invention.

FIG. 4 of the sight glass system shows a side view of the second embodiment of the present invention which further illustrates the composition of components (2.1) and (7.1) with respect to service head cap (1), sight glass (6), and drain plug (8).

Figure 5:
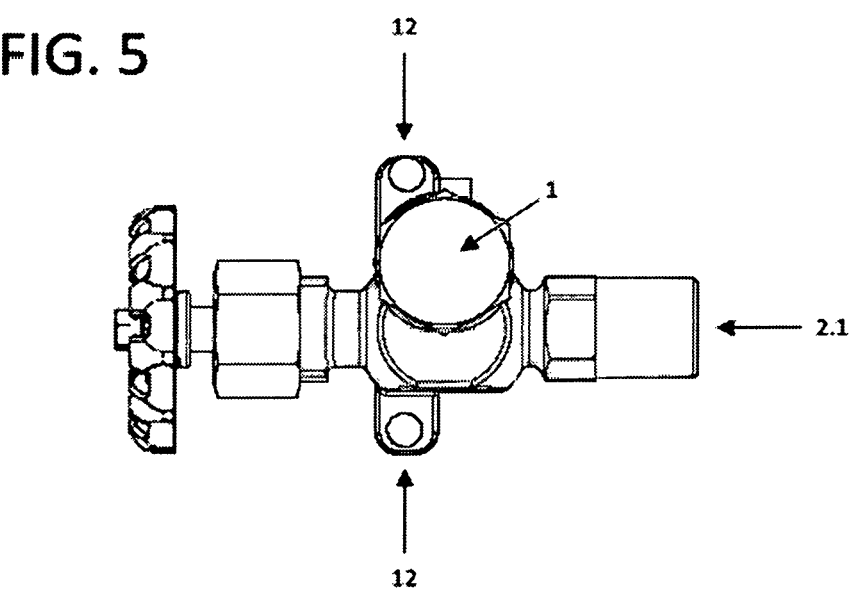
FIG. 5 is a top view of a second embodiment of the sight glass system of the present invention.

FIG. 5 of the sight glass system shows a top view of the second embodiment of the present invention in which comprised component (2.1) is offset to service head cap (1). It is certain from FIG. 3 and FIG. 4 that service head cap (1) is in alignment with sight glass (6 not shown in specified figure) and drain plug (8 not shown in specified figure). Furthermore, component (2.1) is adjacent to service head cap (1) at such a distance to ensure easy placement and removal of sight glass (6 not shown in specified figure).

It should be noted that the second embodiment of the present invention has been tested by a manufacturer of high quality industrial valves for a variety of applications. This embodiment of the present invention has been certified to meet industry standards for both seat and shell testing.

Seat tested at 300 psi Hydrostatic. No leakage allowed.
Shell tested at 300 psi Hydrostatic. No leakage allowed.

It will be readily understood that various designs of the sight glass system of the present invention although not shown or discussed in detail fall within the scope of the claims of this invention.

We claim:

1. A sight glass system for boilers and tanks comprising:
a first component (2.1) having a main body and a first end and a second end with a first central axis extending therethrough, and an opening extending through from an upper portion to a lower portion, and said opening defining a second central axis extending therethrough, a first flange protruding from a first side of said first component and a second flange protruding from a second side opposite said first side of said first component, said first flange and said second flange having an aperture extending therethrough, said upper portion having an upper surface that is substantially flat;
a second component (7.1) having a main body and a first end and a second end with a first central axis extending therethrough, and an opening extending through from an upper portion to a lower portion, and said opening of said second component defining a second central axis extending therethrough, a first flange protruding from a first side of said second component and a second flange protruding from a second side opposite said first side of said second component, said first flange and said second flange of said second component having an aperture extending therethrough, said aperture of said first flange of said first component and said aperture of said first flange of said second component being in substantial alignment, and said aperture of said second flange of said first component and said aperture of said second flange of said second component being in substantial alignment;
said second central axis of said first component and said second central axis of said second component being in substantial alignment, said second central axis of said first component and said second central axis of said second component being offset and not intersecting said first central axis of said first component or said first central axis of said second component;
a service head cap (1) having an internal threaded portion engaging an external threaded portion of said opening at said upper portion of said first component, said service head cap being solid;
a drain plug (8) having an internal threaded portion engaging an external threaded portion of said lower portion of said second component, said drain plug having a portion extending from an upper surface configured for insertion into said opening of said second component when said drain plug is in an installed position;
a sight glass (6) extending from said lower portion of said first component to said upper portion of said second component;
a first protection rod (12) extending through said apertures of said first flanges; and,
a second protection rod (12) extending through said apertures of said second flanges;
whereby a portion of said service head cap overlaps a portion of said substantially flat portion of said upper surface;
whereby said sight glass is configured to be removed through said upper portion of said opening in said first component or removed through said lower portion of said opening in said second component.

* * * * *